Feb. 3, 1931. K. K. PALUEFF 1,790,718
CONDENSER
Filed April 1, 1927 4 Sheets-Sheet 1

Inventor
Konstantin K. Palueff,
by *[signature]*
His Attorney.

Feb. 3, 1931.  K. K. PALUEFF  1,790,718
CONDENSER
Filed April 1, 1927   4 Sheets-Sheet 2

Inventor
Konstantin K. Palueff,
by *Alexander S. Kentz*
His Attorney.

Feb. 3, 1931

K. K. PALUEFF 1,790,718

CONDENSER

Filed April 1, 1927

Inventor
Konstantin K. Palueff,
by *Alexander S. [signature]*
His Attorney.

Patented Feb. 3, 1931

1,790,718

UNITED STATES PATENT OFFICE

KONSTANTIN K. PALUEFF, OF PITTSFIELD, MASSACHUSETTS, ASSIGNOR TO GENERAL ELECTRIC COMPANY, A CORPORATION OF NEW YORK

CONDENSER

Application filed April 1, 1927. Serial No. 180,117.

My invention relates to electric condensers. More particularly it relates to a type of condenser especially adapted for use in connection with the transmission of carrier currents and the like, and which is preferably filled with a liquid dielectric medium such as transformer oil.

Among the objects of my invention are the following: to provide an improved construction in a condenser of the above character which will facilitate assembling, demounting, and transporting the device; to provide an improved form of conservator for the condenser; to provide an improved form of construction with respect to the solid insulation which will insure effective circulation of the insulating liquid in which the condenser is immersed; and the provision of suitable glands in the circulatory system for preventing the dielectric strength of the liquid from deteriorating.

However, the invention will be more fully understood from the following specification, reference being had to the accompanying drawings, in which Fig. 1 shows a section of the condenser of the invention in elevation;

Figure 1:
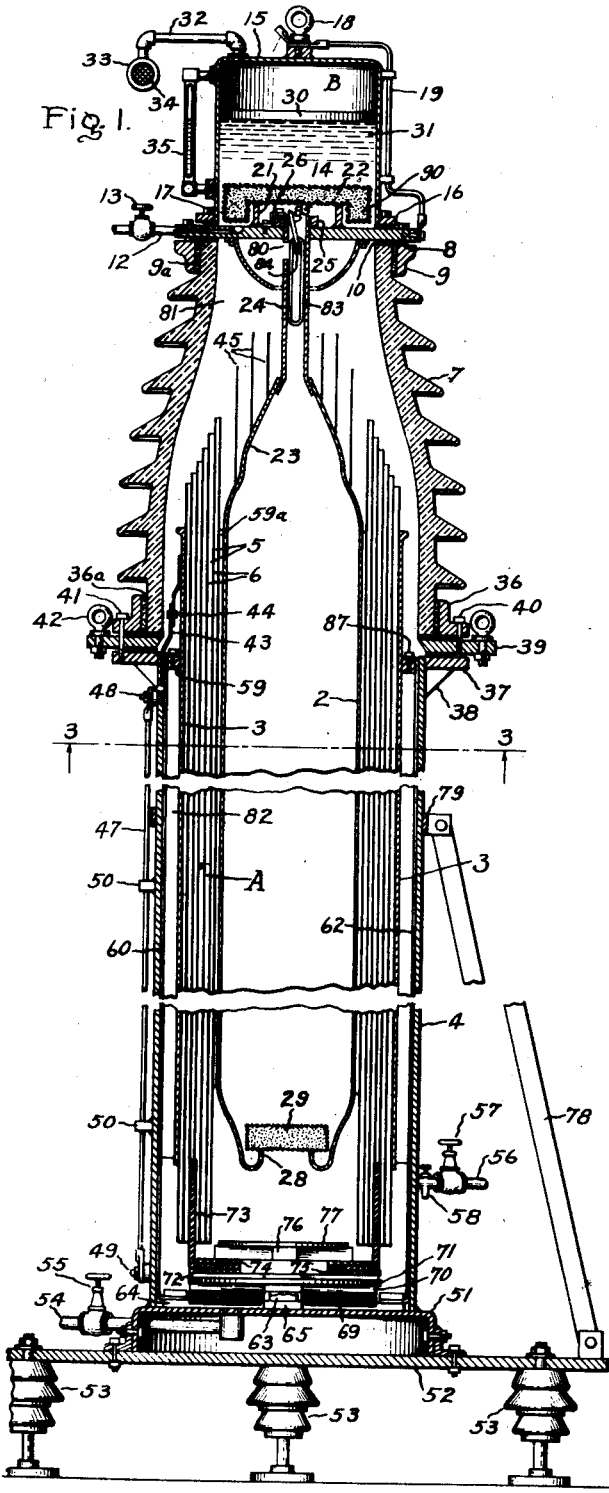
Figure 3:
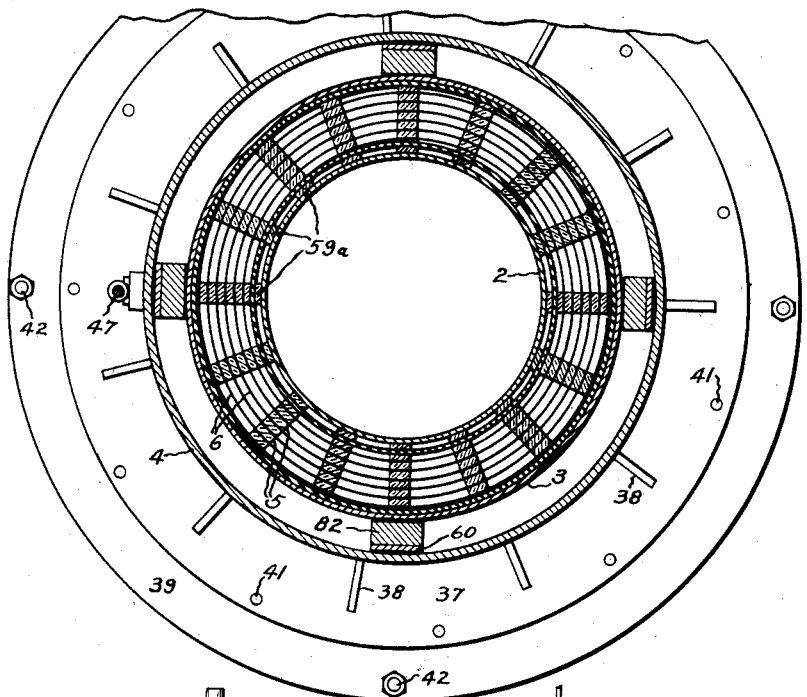
Fig. 3 shows a section of the condenser of Fig. 1 taken on line 3—3, but enlarged.

Referring more in detail to the drawings, the condenser, when in the form shown in Fig. 1, comprises two conducting elements 2 and 3 which for convenience will be called respectively the inner and the outer plates or conductor elements of the condenser. Both of these elements are preferably round and are located within the tank 4, and are separated by an insulation cylinder A constructed with spacers 5 of insulating material such as press-board. These spacers serve to separate the consecutive layers of sheet insulating material 6 which is spirally wound as indicated in Fig. 3.

The tank 4, as indicated in the drawings, is provided with a bushing 7, preferably of porcelain, suitably secured thereto. On the top of the bushing there is provided a conservator or expansion chamber B of special construction. This conservator is secured to the top of the bushing in any convenient manner. As shown, the bottom plate 8 of the conservator serves as a cap for the bushing 7. Around the neck of the bushing there is provided a metal collar 9 which is suitably secured to the bushing 7, as for example by means of cement 9a. Separating the plate 8 from the top of the porcelain bushing 7 there is a gasket 10 which serves to make the joint between elements 7 and 8 oil tight. It will be seen that the plate 8 is provided with a duct, the outer end of which connects with the pipe 12 which latter is provided with the shut-off 13. This duct, as shown, opens into the chamber 14 on the upper surface of the plate 8 and serves to draw off any water that may collect at the bottom of the chamber. The casing 15 of the conservator is provided with a collar 16 in order to enable the casing 15 to be secured to the plate 8 as, for example, by means of the bolts 17. In order to insure a liquid tight joint, a gasket is interposed between the plate 8 and the casing 15. The central terminal 18 of the condenser is mounted on top of the casing 15 and is electrically connected to the plate 8 by means of a cable 19. As indicated, the plate 8 is provided with a central opening through which a pipe 24 projects and which serves to support the inner element 2 of the condenser. As indicated, an externally threaded ring or flange 21 is placed around the central opening of the plate 8 to form a support for a gland 22, which gland is preferably in the form of a wire basket filled with a suitable hygroscopic material such as fuller's earth. The flange 21 may be secured to the plate 8 by welding.

The upper end of the cylinder 2 which is preferably copper is spun to form a tapering section 23 to which the metal pipe 24 is connected as, for example, by brazing, soldering or the like. The upper end of the pipe 24 which is preferably copper is threaded to receive a nut 25. In order to insure good electrical connection between the nut 25 and the metal plate 8, a copper link 26 is provided, one end of which is attached to the nut 25 as, for example, by a bolt, and the other end of which is similarly attached to the plate 8. The cylinder 2 is provided at the bottom with an opening which is surrounded by a ring 28 formed, for example, by folding the metal of the cylinder 2. This ring serves as a seat for a second gland 29 which gland is of similar construction and contains the same material as the gland 22. The ring also forms a sump within the element 2. It will be seen that the two glands 29 and 22 are immersed in the dielectric of the condenser, one near the top and one near the bottom.

When the condenser is filled with oil the upper level of the oil is at a point indicated by the element 30 which is in the form of a float resting on the upper surface of the oil 31 within the casing 15. The float 30 serves to protect the oil or other liquid from the action of the air in the chamber 14. Of course, the oil 31 will expand and contract with variations in temperature and therefore the float 30 will rise and fall within the chamber 14, which chamber is connected with the atmosphere by way of the pipe 32 which is provided with an open terminal 33, the ends of which are covered with fine wire screen 34. In connection with the conservator B, a suitable gauge 35 is provided for the purpose of indicating the level of the liquid within the condenser.

It will be seen that the lower end of the bushing 7 is provided with a metal collar 36 which collar is secured to the bushing 7 by means of cement 36a. The tank 4 is provided, around its upper end, with a metal ring 37 which ring may be secured to the tank by welding and by reinforcing brackets 38, the ends of which latter may also be welded to the ring and to the tank. Between the rings 37 and 36 near the base of the bushing 7 a metal ring 39 is interposed between two gaskets, one on each side as indicated. For the purpose of securing the rings 36 and 39 together, a number of bolts 40 are used around the circumference of these rings. Also for securing the rings 36 and 37 another set of bolts 41 are provided around the circumference of these rings. By means of these bolts 41 the rings 36 and 37 are drawn together, clamping between them the ring 39 and the gaskets on either side. Thus an oil tight joint is assured and any leakage of the liquid contained within the condenser is prevented.

Figure 4:
Fig. 4 shows the inner conducting element or plate of the condenser.
Figure 9:
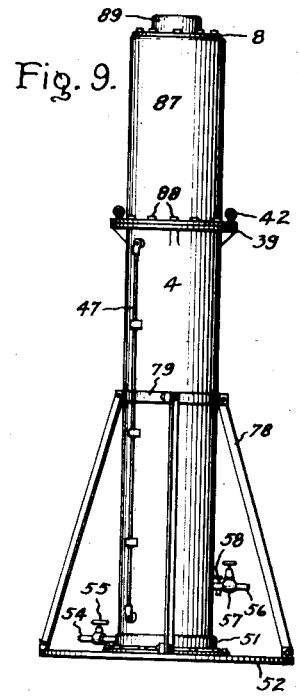
Fig. 9 shows the condenser with the shipping cap in place, and ready for shipment.

It will be seen that around the circumference of the ring 39 a number of eyebolts 42 are provided. These eyebolts are used for raising and lowering, or moving the device. These bolts are also shown in Fig. 9, in which figure the condenser is shown with its shipping cap in place. As shown in Fig. 1 the tank 4 is placed in substantial electrical connection with the electrode 3 of the condenser by means of a metal strap 43, one end of which is electrically secured to the condenser element 3 and the other to the tank 4. For convenience, the strap 43 is made in two sections, as shown in Fig. 1, both sections of which are held in electrical contact by means of a bolt 44 for example. When the condenser elements shown in Fig. 4 are to be removed from the tank, the bolt 44 is, of course, removed.

For the purpose of increasing the dielectric strength of the condenser around the upper or neck portion of the electrode 2, a number of cylinders 45 of dielectric material are placed around the pipe 24, these cylinders resting on the sloping portion 23 of the electrode as shown. These dielectric cylinders 45 are preferably of different lengths as indicated in Fig. 1. As shown in this figure, the first two cylinders rise to the same level, the next cylinder rests lower on the electrode and terminates at a lower point. These cylinders may be of any suitable dielectric material, such as pressed wood, horn fiber, or the like. The insulating cylinder A which surrounds the electrode 2 is formed by radially arranging the spacers 5 and spirally winding the insulating sheet 6 as indicated in Fig. 3. Secured to the tank 4, see Fig. 1, there is provided a copper rod 47. This rod is bolted at the points 48 and 49 and supported at intermediate points 50. This rod 47 forms the second connection terminal of the condenser. Therefore, by establishing connection with the rod 47 anywhere along its length, connection may be made with the condenser element 3.

As shown, the tank 4 is provided with a base 51 to which base the tank is welded in order to insure against any leakage. The base 51 rests upon the platform 52 which latter is supported upon suitable insulators 53. A pipe 54 provided with a shut-off 55 extends through the base 51 and opens into the chamber within the tank 4. Another pipe line 56, a short distance above the base 51, is also provided, which pipe line is connected with the tank 54 by way of a shut-off 57. The object of this arrangement is to enable the oil or other fluid in a lower portion of the condenser being renovated without the necessity of removing all of it from the condenser. Just behind the shut-off 57, that is, between the shut-off 57 and the tank 4, there is a pet cock 58 for the purpose of drawing small quantities of the insulating fluid when a test of it is desired.

Figure 2:
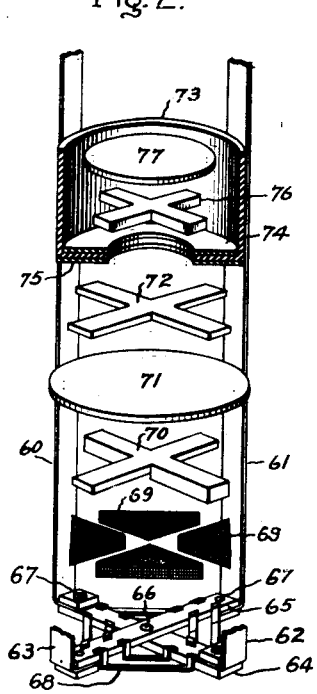
Fig. 2 shows the elements of the lifting basket which holds the condenser, said elements being separated and shown in perspective and partly in section.
Figure 5:
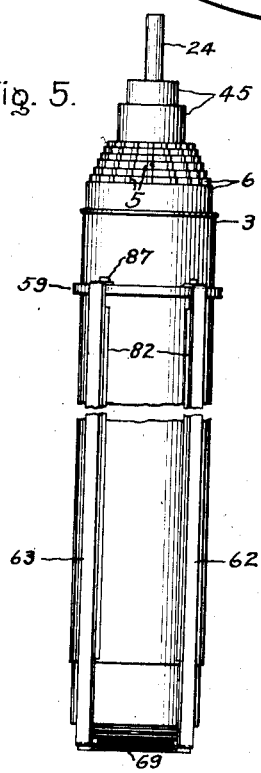
Fig. 5 shows the condenser with its conducting plates assembled within the lifting basket, but removed from the tank or casing.

It will be understood that the condenser element 3 together with the insulating cylinder A are supported by the holder or basket shown in Fig. 2. This basket has a metal ring 59, see Figs. 5 and 1. Along its sides the basket has a set of metal links, 60, 61, 62 and 63, see Fig. 2. These links are connected to cross arms 64 and 65 which may be of steel. and which may be secured at their intersection, for example, by the bolt 66. These links 60, 61, 62 and 63 are secured to the steel cross by means of bolts 67. Between the arms of the cross there are provided steel strips 68 which serve to support the sections 69 of a third gland, so shaped as to fit the spaces between the arms 64 and 65. Each of these sections 69 consists of a wire cage containing hygroscopic material, the same as the glands 22 and 29. Over the cross arms 64 and 65 and extending above the gland sections 69 there is located a press-board cross 70, see Fig. 2, and over the cross 70 there is provided a press-board disc 71. On top of the disc rests another press-board cross 72 and upon the latter there rests an insulating container 73. The bottom of the container 73 is lined on the inside with a press-board washer 74 and on the outside with a press-board washer 75. As shown in Fig. 2 the elements 73, 74 and 75 are perforated about the vertical central axis. Designed to rest over the perforated region of the container 73 there is a press-board cross 76 on top of which latter there is a press-board disc 77 which latter is designed to serve as a rest at times for the cylinder 2, as, for example, during the process of constructing or demounting the condenser.

In order to give stability to the condenser upon the platform 52, a number of strut elements 78 are provided, which elements are secured at one end to the ring 79 which surrounds the tank. The other ends of the struts are secured to the platform 52 as shown.

After the condenser is assembled, a suitable amount of liquid, such as transformer oil, is allowed to flow into the condenser as, for example, through the pipe 54. The oil is allowed to rise in the condenser up into the conservator to a level such as that indicated in Fig. 1. When the condenser is in operation the heat developed will cause the oil to circulate upwardly through the central portion of the cylinder 2 entering the cylinder through the gland 29. After reaching the top, that is, after it reaches the tube 24 the liquid will then emerge by way of the opening 80 into the chamber 81 in the bushing element. It then passes down through the layers formed within the insulating cylinder A and through suitable perforations in the ring 59, not shown, toward the base of the condenser, passing through the gland 69 and rising again through the central portion of the condenser as already described. The fluid also passes in its downward course between the inner surface of the insulating cylinder A and the outer surface of the element 2, the element 2 being separated from the insulating cylinder A by a number of spacers 59a of press-board material running parallel to the axis of the condenser. I also provide between the links 60, 61, 62, and 63 and the element 3, spacers 82 of any suitable material such as press-board or wood which serve to hold the condenser elements in proper position.

Referring to the conservator in the upper portion of the condenser, it will be understood that the ring 21 is carefully welded to the plate 8 in order to avoid the possibility of any leakage of water that may collect between the walls 15 of the conservator and the ring 21. Between the ring and the walls of the conservator a sump is therefore formed into which the rim 90 of the basket 22 projects. The object in providing this sump is to enable any water which may be collected about the ends of the basket 26 to settle and separate from the oil. When this takes place it is possible to draw off this water through the pipe 12 by way of the shut-off 13.

From the description of the basket shown in Fig. 2 it will be seen that this basket serves as an effective rest for the inner condenser element or collecting plate 2 and is at the same time so constructed as to enable the dielectric fluid to readily pass from the region near the walls of the tank 4 into the cavity of the collecting plate 2, thus maintaining proper circulation through the element 2 and around and about the outer element of the collecting plate 3 of the condenser.

Whenever the condenser, Fig. 1, is to be dismantled, the oil is removed and the conservator casing is removed by removing the bolts 17. After this is done the gland 22 is removed. It will be seen that within the pipe 24, Fig. 4, a chain is located having two links, the lower link 83 of which is threaded by a pin 84 which extends through the tube 24 and is secured thereto. The second link 85 of the chain is much shorter than the link 83. See Fig. 1. In order to raise the central electrode of the condenser, a hook 86 from any suitable device such as a crane is inserted in the link 85 of the chain, and by raising the crane both links 85 and 83 are raised. The lower end of the link 83 finally strikes the pin 84 with the result that the weight of the central electrode is now supported by the link 83 and the condenser may be but slightly raised in order to relieve the nut 25 of the weight of the central electrode. The nut 25 may now be removed after unlocking the nut by removing the bolts from the link 26 which electrically connect the nut 25 with the plate 8, Fig. 1. After the nut 25 has been removed, the central electrode may be lowered within the tank until it rests upon the top plate 77 of the basket previously described. After this has been done, the plate 8 may be removed from the top of the bushing 7. After the plate 8 is removed, the bushing 7 may be removed from the tank 4 by first removing the bolts 40. After the plate has been removed, the central electrode may be removed from the tank.

The central electrode element of the condenser having been removed, the outer electrode element 3 may be removed as follows: First the bolt 44 is removed, Fig. 1, and then the bolts 87, Fig. 1, which secure the links 60, 61, 62 and 63 to the ring 59 are removed, one at a time. In place of each bolt there is substituted a long eyebolt, the lower end of which is threaded in the ring 59. After the long eyebolts have been substituted for the bolts 87, the whole basket, Fig. 2, together with the contained insulating cylinder A and the outer condenser electrode 3 may be removed by lifting out of the cylinder 4. It is obvious that the reverse operation will be carried out when the condenser is being assembled.

Figure 10:
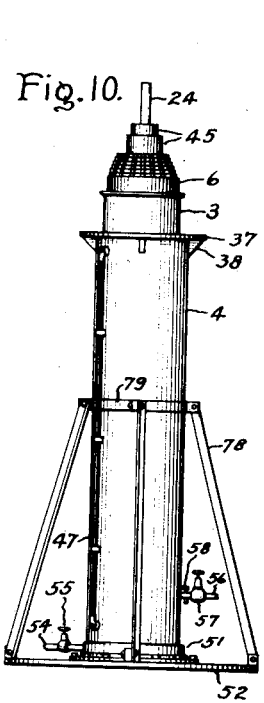
Fig. 10 shows the condenser of Fig. 6 with conservator and bushing removed.
Figure 6:
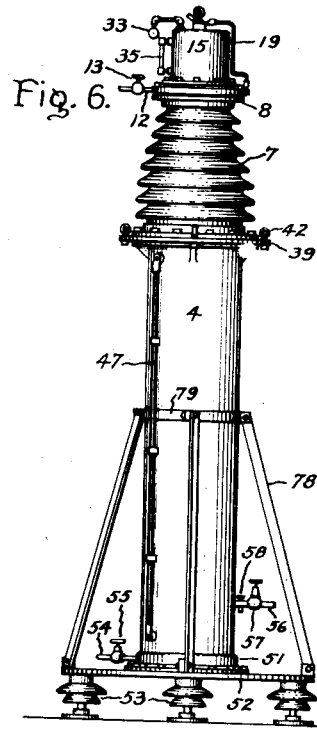
Fig. 6 shows the condenser with one form of bushing completely assembled.

When the condenser is to be shipped, the conservator and the bushing are removed, as heretofore described, leaving the condenser in the condition as shown in Fig. 10. After this has been done, the shipping cap 87, Fig. 9, is then applied to the ring 37 by any suitable means such as the bolts 88. After the shipping cap 87 has been applied, the plate 8 of Fig. 1 is attached to it, see Fig. 9, and the electrode 2 is attached to the plate in exactly the same manner as it is attached to it on Fig. 1. Then the cap 89 is screwed over the flange 21 (of Fig. 1) which flange is externally threaded. The condenser, as shown in Fig. 9, is ready for shipment.

It will be seen that with a condenser of the form described, the ring 39 and the rim of plate 8 may be considered as the terminals of the condenser in the air medium. The tube 24 is, of course, directly connected with the plate 8 and with the cylinder 2, but the tube and cylinder are both immersed in the oil. As is well understood, a liquid such as transformer oil is a much better insulating medium than air. Consequently the electric pressure at which air will break down is lower than the pressure at which the oil will break down. Of course by applying a given electric pressure across the terminals of the condenser, certain stresses are built up, for example, between the rings 36 and 37 at one end and the plate 8. I have found that by increasing the voltage across the terminals of the condenser, a breakdown will take place between the plate 8 and the ring 36, for example, over the bushing 7 in the air. I have further found that by reducing the size of the tube 24 the same voltage may again be applied across the terminals of the condenser and no breakdown will take place. Heretofore it has been the practice, in order to prevent such breakdown at a high voltage to interpose between the inner condenser element 2 and the outer element, one or more concentric metal tubes, Fig. 1, having a common longitudinal axis. Such construction is common in connection with bushings of transformers and the like, but in a device of this sort the expense would be prohibitive. I find that by the mere expedient of substituting a pipe 24 of smaller diameter for a larger one the same result is obtained, namely, redistribution of the static stresses so that the density of the stresses in air are reduced to a point below the breakdown point, while the stresses along the conductor immersed in the oil or other liquid dielectric are raised by increasing the potential gradient within the oil and reducing the potential gradient in the air. The degree to which the stress density within the oil is raised, of course, must not be above that which the oil can stand, or else the breakdown will take place inside of the bushing. Therefore, the diameter of the pipe 24 cannot be reduced to a point where the density of the stress becomes too great inside. I find, therefore, that if two terminals are located in a common insulating medium and one of these is connected with a conductor located in a different insulating medium, one of higher dielectric strength for example, it is possible to raise the amount of voltage that may be applied to the two terminals in the common medium by reducing the diameter (and therefore the surface area) of the conductor which is immersed in the medium having the higher breakdown strength. I have found further that where ordinarily the potential gradient between the two air terminals, such as the terminals 39 and 8, is not uniform, due to the lack of uniformity of the formation of the structure, the gradient may be rendered uniform by rendering the cross sections of the conductor in the high dielectric non-uniform. That is, by restricting the diameter within a certain longitudinal distance of the conductor 24 a certain distribution of the potential along the air path is produced along a certain distance between the terminals located in the air. By varying the diameters of the conductor 2 further on, the potential gradient along a lower band in the air may be produced, and so on. So that by constructing the conductors 2 and 24 with varying diameters the potential gradient along the surface of the bushing 7 may be regulated so as to approximate, for example, a straight line.

Figure 7:
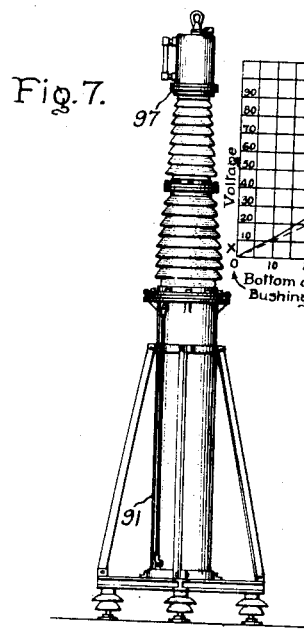
Fig. 7 shows another completely assembled condenser with a double form of bushing which is adapted for transmission lines of higher voltages.
Figure 11:
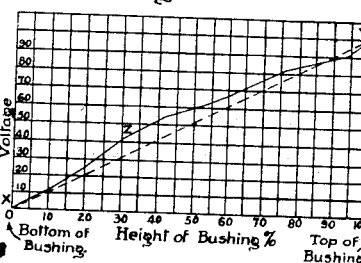
Fig. 11 is a curve showing the voltage distribution along the outside surface of the bushing of Fig. 6.
Figure 12:
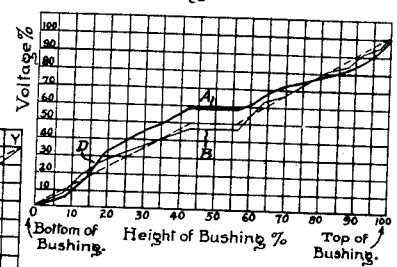
Fig. 12 shows in a similar manner the distribution along the bushing of Fig. 7 when inner rods of two different diameters are used.
Figure 13:
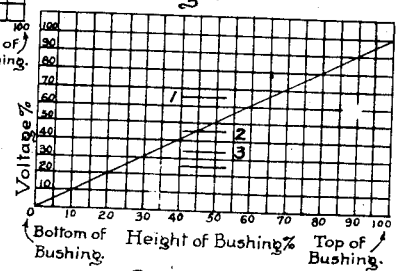
Fig. 13 shows how the potential where the two bushing sections come together in Fig. 7 varies with change of diameter of the line rod within the bushing.

For example, and referring to Fig. 11 and assuming two points of an electric device in one dielectric similar to the points represented by the rings 36 and the plate 8 to be represented by the points X and Y, the dotted straight line will represent a uniform gradient between the two points. However, ordinarily in practice the gradient is not uniform. The solid line is taken to represent the actual gradient obtained in a concrete case. At the point Z, and for a considerable distance on either side the gradient deviates considerably from the uniform gradient represented by the dotted line. I find that the solid line may be caused to approach a straight line by regulating the diameters of different sections of the conductor, such as the conductor 24, in the dielectric. This may be more fully explained by referring to Fig. 12. The dotted line in Fig. 12 may be considered as representing a straight line gradient of a device in the air similar to that shown in Fig. 7. By changing the configuration of the central conductor in the oil the gradient may be caused to assume the form represented by the lighter solid line B. It will be seen that at the point D, where the lines A and B (corresponding to two forms of the conductor) cross, the diameter of the conductor at a point D is larger than it should be. By reducing the diameter of the conductor at that particular point the gradient can be made to approach the dotted line. By decreasing the diameter of the conductor sufficiently the line may be caused to pass to the other side of the dotted line as it does, for example, along the line B at two different points. This feature of the invention is probably more forcefully illustrated in connection with Fig. 13. The straight line represents a uniform gradient. Line 1 represents the potential of the central ring N, Fig. 8. It will be observed that this line is considerably above the straight line. By reducing the diameter of the conductor in the same region the potential represented by line 2 is reduced. By still further reducing the diameter in the same region the potential in the corresponding region in the air is still further lowered, as indicated by line 3. Therefore, by successive reductions the gradient may be steadily reduced in the same region. Similarly, any other section of the conductor may be reduced to effect corresponding reductions of the potential gradients in the opposite medium.

Figure 8:
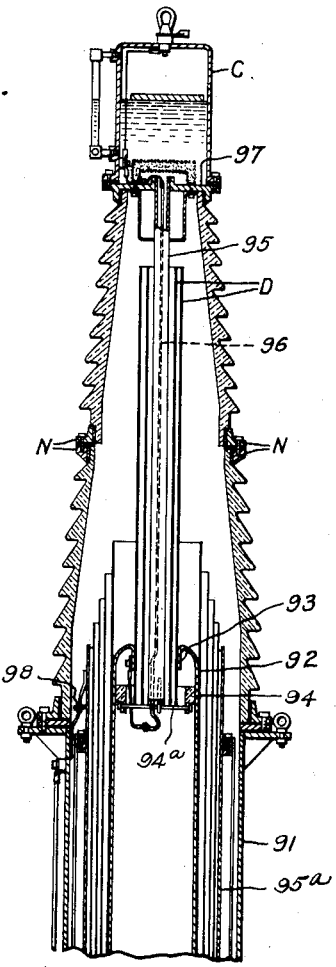
Fig. 8 is a section showing the construction of the double bushing arrangement in Fig. 7.

Referring to Fig. 8, it will be seen that, in this form of condenser, two sections of bushing each similar to that shown in Fig. 1 are assembled one over the other on top of the container 91. In this form of the condenser the central metal collecting element 92 corresponding to element 2 in Fig. 2 is folded so as to form an opening with a ring 93 about the latter. Within the element 92 there is provided a collar 94 which is secured to the walls of the element 92 in any suitable manner. This collar is provided with a bolt 94a. On the lower end of the metal pipe 95, which corresponds to the pipe 24 in Fig. 1, there is provided a hook which passes under the bolt 94a and serves to support the weight of the central condenser element 92. It will be seen that along the central hollow portion of the pipe 95 there extends a conductor 96 which establishes electrical connection between the element 92 and the plate 97 at the bottom of the conservator C, said plate corresponding to the plate 8 in Fig. 1. Surrounding the pipe 95 which corresponds to the condenser element 24 of Fig. 1 there is provided an insulating tubular cellular body D, the construction of which is similar to that of the insulating body A in Fig. 1. This insulating body D increases the dielectric strength of the medium about conductor 96.

As indicated in the drawing, the said outer element 95a of the condenser, Fig. 8, is electrically connected with the outer casing 91 by means of straps bolted together by a bolt 98.

While I have elected to describe my invention in connection with specific embodiments described in the specification and illustrated in the drawings, I do not wish to be limited to such specific construction inasmuch as in view of the disclosure other variations and modifications may be resorted to without departing from the spirit of the invention or from the scope of the claims contained herein.

What I claim as new and desire to secure by Letters Patent of the United States is:

1. In a condenser, a pair of conductors in a common insulating medium, and a third conductor in a different insulating medium and conductively connected with one of said pair of conductors, whereby said connected conductors have the same potential when there is a potential difference between the two conductors of said pair, said third conductor being located to extend its static field into said common insulating medium between the two conductors of said pair, and said third conductor being formed and proportioned to produce by its static field a substantially uniform potential gradient in said common insulating medium between the two conductors of said pair.

2. In an electric condenser, a container therefor, an opening in the container about the longitudinal axis of the condenser, an insulating bushing supported by the container, said bushing being hollow and having an opening on each end and mounted over the opening of the container, the openings of the bushing being located about the longitudinal axis of the condenser and forming an upper rim and a lower rim, said condenser having two metal surfaces insulated from each other within a cavity formed by the container and the bushing, one of said metal surfaces being supported pendant from the region of the rim of the container, and the other of said surfaces being supported pendant from the region of the upper rim of the bushing, a partition of solid insulating material separating the two surfaces, one terminal of the condenser being mounted upon the bushing and connected with one of said surfaces within the container and the other terminal of the condenser being attached to the container and connected with the other surface of the condenser.

3. An electric condenser located within a container, the latter comprising a metal base and an insulating bushing superimposed upon and supported by the base, a cradle in the container for supporting the condenser, said cradle being supported by the container below the bushing, means for supporting one of the metal surfaces of the condenser from the bushing, a terminal for the condenser supported by the bushing and connected to the metal surface supported by the bushing, and another terminal for the condenser supported by the base of the container and electrically connected to the other metal surface of the condenser.

4. A condenser located within a container, an insulating liquid in the container, said condenser having two metal surface elements, said surfaces being separated by a partition of solid insulating material, said partition being cellular in form whereby the insulating liquid may flow through the spaces in the partition, one of said surfaces being in tubular form, a hygroscopic gland in proximity to one opening of a tubular surface, and another hygroscopic gland in proximity to another opening of the tubular surface, whereby the liquid in circulating may flow through said glands.

5. A condenser located within a container, said condenser having two metal surface elements, said surfaces being separated by a partition of solid insulating material, said partition being cellular in form whereby an insulating liquid may be caused to flow through the spaces in the partition, one of said surfaces being in tubular form, a hygroscopic gland in proximity to one opening of a tubular surface and another hygroscopic gland in proximity to another opening of the tubular surface, whereby the liquid in circulating may flow through said glands, a cellular foundation for the condenser within the container, and a hygroscopic gland located in the cellular structure, whereby the liquid in circulating in the container may pass through said third gland.

6. In a condenser, a conducting element in one dielectric medium and a conducting element in a different dielectric medium both conductors having terminals in the same medium, the conducting element in the first medium being proportioned and being so located with respect to said terminals that a substantially uniform potential gradient is insured in the dielectric medium between said terminals.

7. A condenser located within a container and immersed in a dielectric liquid, the collecting elements of the condenser being separated by a cellular partition surrounding one of said elements, the latter element being hollow and having an inlet opening below and an outlet opening above, said openings connecting the chamber within the said latter element with the container chamber whereby the liquid may circulate between the elements through said hollow element, and a hygroscopic body within the hollow element and immersed in the liquid for removing moisture from the latter, and a sump in the hollow element and in proximity to the body for collecting water therein.

8. A condenser, a container therefor, a dielectric in said container other than air in which one of the metal elements of the condenser is immersed, a bushing on said container, the outer surface of said bushing being in air, a terminal on said bushing, a conducting element connecting one of the condenser metal elements with said terminal, said conducting element being formed to insure a substantial uniform potential gradient over the outer surface of the bushing.

9. A condenser, a container therefor, a liquid dielectric in the container within which the condenser metal elements are immersed, said elements being separated by a solid dielectric structure arranged with passages therethrough, one of the metal elements of the condenser being also formed with passages therethrough, said container and passage forming a continuous path within which said liquid may circulate, and a plurality of hygroscopic units located at different points in the circulatory path of the liquid.

10. A condenser, a container therefor, a fluid dielectric in the container within which the condenser metal elements are immersed, said elements being separated by a solid dielectric structure arranged with passages therethrough, one of the metal elements of the condenser being also formed with a passage therethrough, said container and passages forming a continuous path within which said liquid may circulate, a plurality of hygroscopic units located at different points in the circulatory path of the liquid, a conservator attached to said container, the chambers of the conservator and the container being connected whereby said liquid may extend into the conservator chamber, and a float on the surface of said liquid in the conservator for protecting the liquid.

11. A condenser, a container therefor, a liquid dielectric in the container within which the condenser metal elements are immersed, said elements being separated by a solid dielectric structure arranged with passages therethrough, one of the metal elements of the condenser being also formed with a passage therethrough, said container and passages forming a continuous path within which said fluid may circulate, and a plurality of hygroscopic units located at different points in the circulatory path of the fluid, and a conservator attached to said container, the chambers of the conservator and the container being connected whereby said fluid may extend into the conservator chamber, and a float on the surface of said fluid in the conservator for protecting the fluid, and a sump located within the chamber of the conservator.

12. A condenser, a container therefor, a liquid dielectric in the container within which the condenser metal elements are immersed, said elements being separated by a solid dielectric structure arranged with passages therethrough, one of the metal elements of the condenser being also formed with a passage therethrough, said container and passage forming a continuous path within which said liquid may circulate, a plurality of hygroscopic units located at different points in the circulatory path of the fluid, a conservator attached to said container, the chambers of the conservator and the container being connected whereby said liquid may extend into the conservator chamber, a float on the surface of said liquid in the conservator for protecting the liquid, a sump located within the chamber of the conservator, and a hygroscopic unit within said conservator and located over said sump.

In witness whereof, I have hereunto set my hand this 30th day of March, 1927.

KONSTANTIN K. PALUEFF.